United States Patent [19]

Ran et al.

[11] Patent Number: 5,627,601

[45] Date of Patent: May 6, 1997

[54] MOTION ESTIMATION WITH BIT RATE CRITERION

[75] Inventors: Xiaonong Ran, Cupertino; Michael van Scherrenburg, San Jose, both of Calif.

[73] Assignee: National Semiconductor Corporation, Santa Clara, Calif.

[21] Appl. No.: 348,265

[22] Filed: Nov. 30, 1994

[51] Int. Cl.$^6$ ............................... H04N 7/32; H04N 7/30
[52] U.S. Cl. ..................... 348/699; 348/416; 348/402; 348/413; 382/232
[58] Field of Search ........................... 348/699, 402, 348/407, 413, 416, 390, 384, 417; 382/232, 236, 238; H04N 7/30, 7/32

[56] References Cited

U.S. PATENT DOCUMENTS

| | | | |
|---|---|---|---|
| 4,383,272 | 5/1983 | Netravali et al. | 348/416 |
| 4,683,494 | 7/1987 | Furukawa . | |
| 4,689,673 | 8/1987 | Ohki . | |
| 4,873,573 | 10/1989 | Thomas et al. | 348/416 |
| 4,922,273 | 5/1990 | Yonekawa . | |
| 4,985,767 | 1/1991 | Haghiri et al. | 348/429 |
| 5,008,747 | 4/1991 | Carr et al. | 348/417 |
| 5,008,748 | 4/1991 | Carr et al. | 348/417 |
| 5,031,039 | 7/1991 | Haghiri . | |
| 5,043,808 | 8/1991 | Knauer et al. | 348/416 |
| 5,068,724 | 11/1991 | Krause et al. | 348/402 |
| 5,086,439 | 2/1992 | Asai et al. | 348/417 |
| 5,091,782 | 2/1992 | Krause et al. | 348/402 |
| 5,097,320 | 3/1992 | Wilkinson | 348/489 |
| 5,144,429 | 9/1992 | Haghiri et al. | 348/413 |

(List continued on next page.)

FOREIGN PATENT DOCUMENTS

| | | |
|---|---|---|
| 0527446 | 2/1993 | European Pat. Off. . |
| 0570127 | 11/1993 | European Pat. Off. . |

OTHER PUBLICATIONS

H. G. Musmann, P. Pirsch and H.-J. Grallert, "Advances in Picture Coding," Proceedings of the IEEE, vol. 73, pp. 523–548, Apr. 1985.

R. J. Moorhead II, S. A. Rajala and L. W. Cook, "Image Sequence Compression Using a Pel–Recursive Motion-–Compensated Technique," IEEE J. on Selected Areas in Commun., vol. SAC–5, pp. 1100–1114, Aug. 1987.

D. R. Walker and K. R. Rao, "Improved Pel–Recursive Motion Compensation," IEEE Trans. Commun., vol. COM–32, pp. 1128–1134, Oct. 1984.

A. N. Netravali and J. D. Robbins, "Motion–Compensated Television Coding: Part I, " B.S.T.J., vol. 58, pp. 631–670, Mar. 1979.

S. Kappagantula and K. R. Rao, "Motion Compensation Interframe Image Prediction," IEEE Trans. Commun., vol. COM–33, pp. 1011–1015, Sep. 1985.

Primary Examiner—Tommy P. Chin
Assistant Examiner—Vu Le
Attorney, Agent, or Firm—Skejerven, Morrill, MacPherson, Franklin & Friel; Brian D. Ogonowsky

[57] ABSTRACT

A new motion estimation technique is described herein which directly detects the number of bits required to be transmitted to convey the difference between the predicted video data and the current video data, where a fewer number of bits used to convey the difference corresponds to better motion estimation. The search criterion for the best estimate of movement of a block is the minimum number of bits for conveying this difference instead of minimizing the mean squared error (MSE) or mean average difference (MAD). Thus, complex calculations involving MSD or MAD are avoided. The motion estimator of the preferred embodiment uses a look-up table to convert motion compensated difference signals for a block of pels into the number of bits required to be transmitted to convey the difference signals. When it has been determined that a certain estimated displacement of a block would require the fewest number of bits to be transmitted, that displacement is selected as the best estimate, and the corresponding motion vector is transmitted along with a motion compensated difference signal containing the fewest number of bits.

16 Claims, 5 Drawing Sheets

U.S. PATENT DOCUMENTS

| | | | |
|---|---|---|---|
| 5,148,269 | 9/1992 | De Haan et al. | 348/699 |
| 5,150,209 | 9/1992 | Baker et al. | 348/407 |
| 5,151,784 | 9/1992 | Lavagetto et al. | 348/416 |
| 5,184,218 | 2/1993 | Gerdes | 348/390 |
| 5,200,820 | 4/1993 | Gharavi . | |
| 5,206,723 | 4/1993 | Parke | 348/416 |
| 5,227,878 | 7/1993 | Puri et al. | 348/699 |
| 5,301,032 | 4/1994 | Hong et al. | 348/384 |
| 5,329,318 | 7/1994 | Keith | 348/699 |
| 5,337,049 | 8/1994 | Shimoda | 348/390 |
| 5,436,665 | 7/1995 | Ueno et al. | 348/699 |
| 5,457,495 | 10/1995 | Hartung | 348/417 |
| 5,487,086 | 1/1996 | Bhaskar | 348/417 |

MOTION ESTIMATION WITH BIT RATE CRITERION

FIELD OF THE INVENTION

This invention relates to the compression of video signals, and more particularly to an improved motion estimation technique.

BACKGROUND OF THE INVENTION

Video signals for transmission typically originate from video cameras. The bandwidth of these non-compressed video signals is substantial and, consequently, numerous attempts have been made to reduce the bandwidth of the signals for transmission without unduly degrading the images. Typically, to reduce bandwidth, the frames of video signals are encoded, and redundancies in consecutive frames of the encoded signals are extracted and deleted. Only the differences between consecutive frames are then transmitted. Various techniques are used in the art depending on the particular application. One of the techniques for further reducing the bandwidth of moving images is generally referred to as motion compensated predictive coding.

Figure 1:
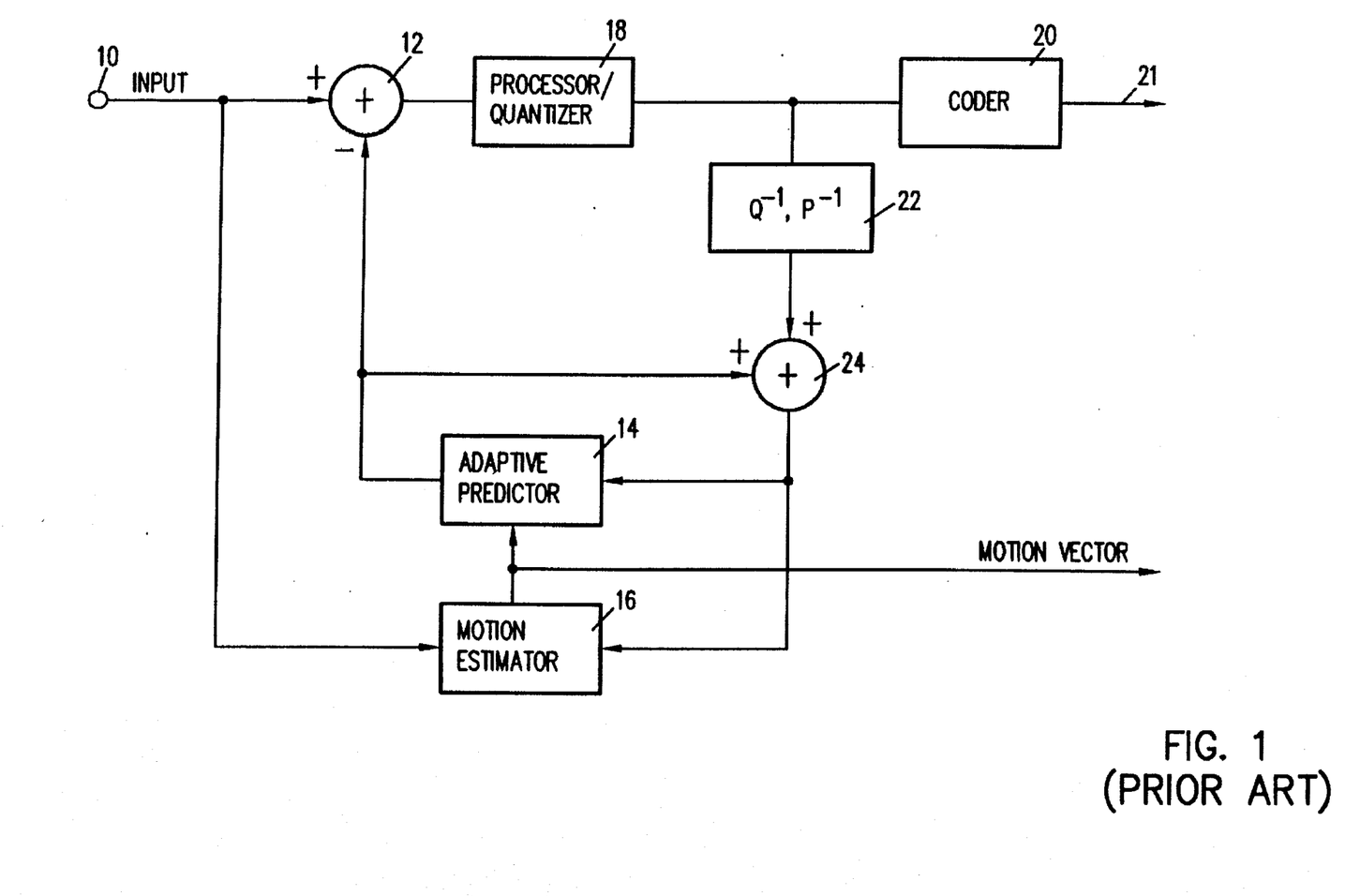
FIG. 1 is a block diagram of a prior art video coding system with motion compensation.

FIG. 1 illustrates one type of conventional video coder which utilizes motion compensation. Video signals in digital form are received at input 10. It will be assumed for FIG. 1 that the video data applied to input 10 is in a well known block format wherein blocks of 8×8 picture elements (pels) in an image are sequentially applied to input 10. The pels in a block are applied to input 10 in a raster scan type sequence.

A subtractor 12 outputs the difference between the current video signal and a predicted video signal from a predictor 14. Predictor 14 includes a first frame buffer containing the reconstructed previous frame of video data. Thus, the difference between the current video frame applied to input 10 and the predicted video frame outputted from predictor 14 is outputted from subtractor 12. The difference signals for an entire block are then transformed by a processor/quantizer 18 to generate transform coefficients using, for example, discrete-cosine transformation, and the coefficients are then quantized. The quantized coefficients are then encoded by a coder 20 to be in a conventional variable-length type code for additional compression of the video signal. The resulting difference signal is then outputted at output 21 for transmission to a receiver.

Motion estimator 16 compares the current block of video data received at input 10 with the data in a search window of the previous frame (in predictor 14) to identify that region or block of the reconstructed previous frame which the current block most closely resembles. The search window (e.g., 16×16 pels) takes into account the anticipated worst-case motion of a block from one frame to another. The search window is centered at the same location in the previous frame as the current block location in the current frame. Within this search window, the pels of the current block are successively compared to other pels in a block within the search window to find a matching block. The shift of the current block which gives the best match to the corresponding block in the previous frame is deemed to be the best estimate of the displacement of the block between frames. This best estimate is usually determined based on a mean squared error (MSE) or mean absolute difference (MAD) criteria. The amount of this best estimate shift, called the motion vector, is then transmitted to the receiver/decoder.

This motion vector is also applied to the address generator controlling the addressing of the first frame buffer in predictor 14 so that the block of pels outputted by predictor 14 corresponds to the displaced block of pels applied to input 10. Thus, the pels outputted by predictor 14 are motion compensated before being compared with the incoming block of pels, thereby making the predictor 14 output a better prediction of the current frame. This results in the difference outputted by subtractor 12 being, on average, smaller, and permits the coder 20 to encode the picture using a lower bit rate than would otherwise be the case.

Motion estimator 16 may, instead of performing block-matching motion estimation, use a well-known pel recursive technique, which generates motion vectors to minimize the prediction error at each pel. This is more computationally intensive than the block-matching technique.

After the motion vector and coded difference signal are transmitted, the receiver then updates the previous frame (already stored at the receiver) using the transmitted motion vector and difference signal. Two frame buffers at the receiver may be needed to avoid altering search windows for neighboring blocks in the previous frame. One frame buffer would contain the previous frame, and the other frame buffer would store the motion compensated data.

The difference signal outputted by processor/quantizer 18 is also fed back to a second frame buffer in either predictor 14 or motion estimator 16 through an inverse processor/quantizer 22 and adder 24. The output of adder 24 is the motion compensated predicted frame in the first frame buffer plus the difference signal. Thus, the second frame buffer in predictor 14 or motion estimator 16 now stores essentially the current frame of the video image (identical to that stored at the receiver), while the first frame buffer still stores the previous frame.

For the next frame applied to input 10, the functions of the second frame buffer (now storing the previous frame) and the first frame buffer are reversed, so that the second frame buffer outputs blocks of pels to subtractor 12. The above-described block-matching process is then repeated for the next frame.

If a determination is made that the pels of the block have not changed as compared with the previous frame (which is usually the case), a signal is transmitted which signifies to the receiver/decoder that it needs to merely repeat the pels of that block from the previous frame to obtain the pels for the current block.

The primary goal of a video coder is to minimize the resultant transmitted bit rate of a video signal. Thus, a criterion for determining whether the motion estimator 16 has identified the best estimate for the movement of the block being analyzed is the entropy of the displaced block-difference, given a certain constraint on the block-difference quantization distortion. In other words, the better the motion estimate by motion estimator 16, the smaller the number of bits resulting from encoding the block difference, given a certain constraint on the quantization distortion generated.

The above "best estimate" techniques performed by conventional motion estimators are relatively complex and fairly expensive to implement as an integrated circuit. This complex circuitry frequently requires the motion estimator to be formed as a separate integrated circuit, thus amounting to about one-half of the video coder. What is needed is a motion estimation method and structure which uses as much conventional circuitry (and algorithms) as possible but which results in a less expensive, smaller, and simpler video coder/decoder (codec) having motion estimation.

SUMMARY

A new motion estimation technique is described herein which directly detects the number of bits required to be transmitted to convey the difference between the predicted video data and the current video data, where a fewer number of bits used to convey the difference corresponds to better motion estimation. The search criterion for the best estimate of movement of a block is the minimum number of bits for conveying this difference instead of minimizing the mean squared error (MSE) or mean average difference (MAD). Thus, complex calculations involving MSD or MAD are avoided.

The motion estimator of the preferred embodiment uses a look-up table to convert motion compensated difference signals (generated by a subtractor, a processor, and a quantizer) for a block of pels into the number of bits required to be transmitted to convey the difference signals. When it has been determined that a certain estimated displacement of a block would require the fewest number of bits to be transmitted, that displacement is selected as the best estimate and the corresponding motion vector is transmitted along with a motion compensated difference signal containing the fewest number of bits.

Any block-matching search scheme may be used by the motion estimator when searching for a best estimate block displacement, with the criterion for a satisfactory matching being the fewest number of bits required for conveying the difference or error.

The resulting motion estimation unit utilizes significantly less hardware than previous motion estimator units since complex calculations are not performed, and in some cases reduces the hardware cost and size by half with little degradation in performance.

DETAILED DESCRIPTION OF THE PREFERRED EMBODIMENTS

Figure 2:
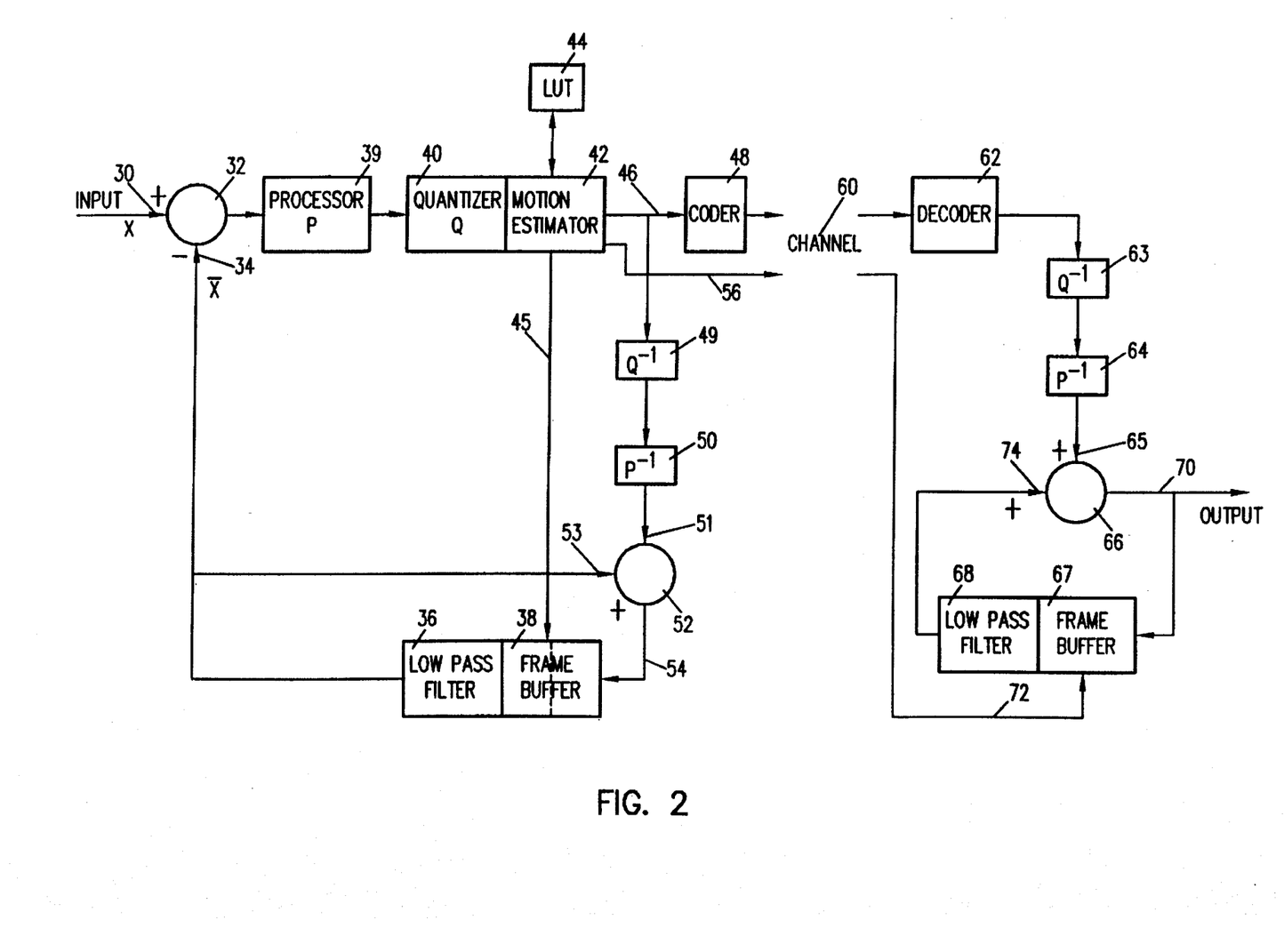
FIG. 2 is a block diagram of the preferred embodiment video coding/decoding system with motion estimation.
Figure 3:
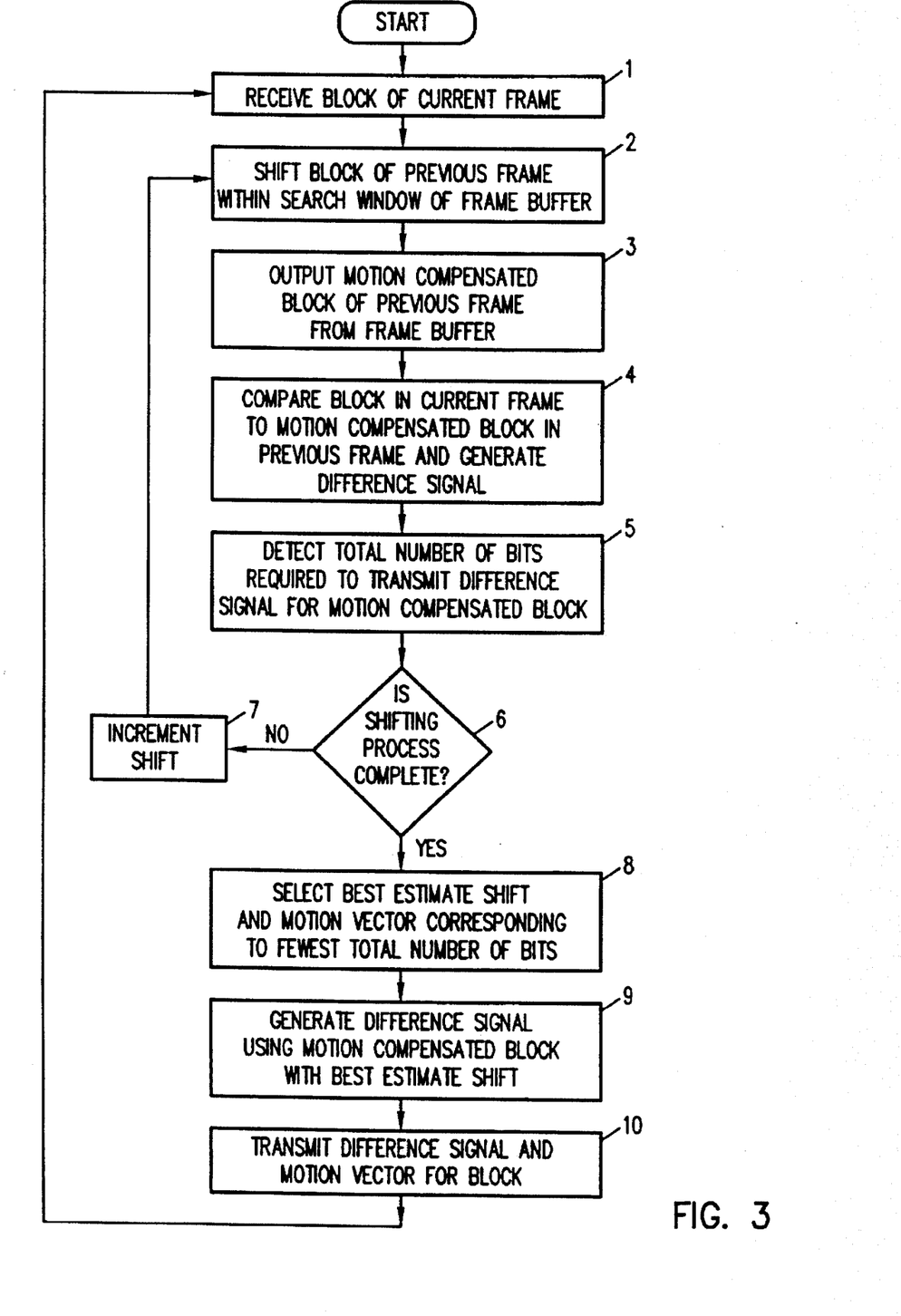
FIG. 3 is a flow chart describing the basic steps performed by the structure of FIG. 2 for carrying out one embodiment of the motion estimation process.

The preferred embodiment video codec is shown in FIG. 2. A flow chart of the basic steps used in the motion estimation process is shown in FIG. 3.

In FIG. 2, digital video data is applied to input 30 of subtractor 32 in a block format. (Step 1 of FIG. 3.) A suitable block organizer buffer (not shown) organizes the input frame into non-overlapping M×N size blocks of the pel data. One block may be 4×4 pels, 8×8 pels, 16×16 pels, or 32×32 pels, depending on the requirements of the system. Digital signals representing each sequential pel of a block are then applied to input 30 in a well known manner.

A second input 34 of subtractor 32 is connected to an output of an optional low pass filter 36, which suppresses high frequency noise. The low pass filter 36 filters the output of a conventional frame buffer 38 which sequentially outputs bytes representing addressed pels in the video frame stored in frame buffer 38.

The output of subtractor 32 is applied to a processor 39 which receives the difference signal for each pel in the block. The processor 39 then performs a transform on the difference signals in the block to generate coefficients (e.g., frequency coefficients) representing the difference signals for the block. This transform may be a well known discrete cosine transform or other suitable transform. One other possible transform coding technique is described in U.S. application Ser. No. 08/153,931, entitled "Quadtree-Structured Walsh Transform Coding," incorporated herein by reference.

Transform coding is a conventional and well known method to reduce the bandwidth of video signals, and the best coding method would be based on the particular requirements for cost, complexity, and the tolerable signal-to-noise ratio of the recovered signals.

Quantizer 40 then quantizes the coefficients to reduce the number of levels. Such a quantizer 40 is conventional and well known. The output of quantizer 40 can be a quantization index of a transformation coefficient, or a group of quantization indexes in, for example, run-level format.

A motion estimator 42 is connected to an output of quantizer 40. Motion estimator 42 is also connected to an address generator for frame buffer 38 via line 45 to cause frame buffer 38 to output a block of pels which has been shifted or motion compensated for input into subtractor 32. If the initial output of quantizer 40 indicates that no significant displacement of the block has taken place between frames, then the transmitted motion vector will be zero, and coder 48 will encode and transmit to the receiver the output of quantizer 40.

If motion has taken place, then motion estimator 42 attempts to motion compensate the output of frame buffer 38 to best match the outputted block to the current block being supplied at input 30. The block difference at the output of subtractor 32 of the current block and the best matching block output from filter 36 will be processed by processor 39, quantized by quantizer 40, and then input to coder 48. The bits output by coder 48 along with the code for the best estimate motion vector will be transmitted to the receiver through an appropriate channel 60.

Other techniques may be used to cause frame buffer 38 to output a motion compensated block of pels.

Motion estimator 42 addresses a look-up table 44 using the quantized coefficients. The look-up table 44 cross-references each quantized value with the number of bits required to be transmitted to convey that quantized value and then outputs that number to the motion estimator 42. The motion estimator 42 then adds up the total number of bits required to transmit the difference signals for the block. This total number of bits represents the extent of the error between the block of the current frame and the motion compensated output of frame buffer 38.

Motion estimator 42 can use conventional block-matching search schemes to repeatedly shift (or motion compensate) the block of pels within a search window outputted by frame buffer 38. (Steps 2 and 3 in FIG. 3.) For each shift of the block outputted by frame buffer 38 (which stores the previous frame), the block is compared with a block in the current video frame and this difference is processed by processor 39 and quantized by quantizer 40. (Step 4 in FIG. 3.) At each iteration, the look-up table 44 in conjunction with the motion estimator 42 determine the total number of bits necessary to transmit this difference. (Step 5 in FIG. 3.)

At the end of the search scheme, which may be a well known full search of a search window or a well known three-step search, the shift that required the fewest number of bits to be transmitted is chosen as the best estimate shift. (Steps 6, 7 and 8 of FIG. 3.)

Thus, instead of calculating mean square error or mean absolute difference at each iteration to determine the error between the motion compensated block and the current block applied to input 30, the number of bits required to be outputted by the video coder is used as the best estimate search criterion.

In one type of searching scheme, the iterative process is stopped when the current quantized difference (as measured by the number of bits required to convey the difference) is not smaller than the difference from the previous step. In another search scheme, various block displacements are first performed, and the displacement resulting in the smallest difference is then selected as the best estimate. In another search scheme, course block displacements are first performed, and finer block displacements are then performed based on the results of the previous block displacement step. Such a scheme is described in application Ser. No. 08/347,771 filed herewith, entitled "Motion Estimation Technique Using a Hierarchial Search," incorporated herein by reference.

In one embodiment, the total number of bits, as determined by the outputs of the look-up table 44, may be used by the motion estimator 42 in adaptively modifying the search strategy performed by the motion estimator 42, such as would be the procedure using a 3-step process. Such a 3-step process is described by Musmann et al. in the article "Advances in Picture Coding," Proceedings of the IEEE, Vol. 73, pp. 523–548, April, 1985. Other searches may use a logarithmetic 2-D search, such as described by Musmann et al. The book "Digital Pictures," by Natravali et al., Plenum Press, 1988, describes additional search techniques.

The chosen best estimate shift is then applied to the address generator for frame buffer 38 via line 45, and the outputted motion compensated block is compared to the corresponding block in the current frame at input 30. (Step 9 of FIG. 3.)

The quantized output of quantizer 40 representing the resulting minimum difference signal is then outputted on line 46 into coder 48. Coder 48 changes the quantized difference into a suitable variable length code, such as a Hoffman code. This code, which will be a minimum number of bits, is then transmitted to a receiver/decoder. (Step 10 in FIG. 3.)

The stored look-up table 44 values would depend on the particular quantizer 40 and coder 48 used.

The quantized difference signal applied to coder 48 for transmission is also applied to an input of an inverse quantizer 49. The output of inverse quantizer 49 is then applied to the input of an inverse processor 50, which performs an inverse transform on the difference signals. The output of inverse processor 50 is applied to an input 51 of adder 52 which has another input 53 connected to the output of filter 36. The output of adder 52 on line 54 is connected to an input of frame buffer 38. This output of adder 52 will thus be the motion compensated block from the previous frame, as corrected by the difference signal, corresponding to the current block. In one embodiment, this motion compensated block is then stored in a second frame buffer within frame buffer 38 so that the second frame buffer will eventually store the current frame.

The first frame buffer in frame buffer 38 continues to be used as the source of motion compensated blocks from the previous frame for application to subtractor 32. For the next frame to be applied to input 30, the functions of the first frame buffer and second frame buffer are reversed, using a multiplexer, so that the second frame buffer now supplies the motion compensated blocks of the previous frame to subtractor 32.

Other ways to store a current frame in frame buffer 38 may also be used. Such methods may simply update portions of a single frame buffer with motion compensated data once those portions of the frame buffer have already been addressed for providing a motion compensated block to subtractor 32. This would avoid the need for two frame buffers. Such techniques are well known in the art.

A motion vector, corresponding to the best estimate shift, is outputted by motion estimator 42 on line 56 for transmission to a receiver. This motion vector is the same vector which minimized the number of bits outputted by coder 48.

The receiver/decoder is also show in FIG. 2. The difference signal outputted by coder 48 is transmitted over channel 60 and decoded by a suitable decoder 62. The decoded difference signal is then applied to an inverse quantizer 63. The resulting signal is then applied to an inverse transform processor 64. The output of processor 64 is applied to an input 65 of adder 66.

The transmitted motion vector on line 56 is received on line 72 and used to displace the corresponding block of video data in frame buffer 67 (which contains a previous frame) to match the position of that block in the current frame. This motion compensated video data in frame buffer 67 is then applied to a second input 74 of adder 66, via low pass filter 68, such that the output of adder 66 on line 70 is the reconstructed motion video data. This reconstructed data is also fed back into frame buffer 67 to cause frame buffer 67 to eventually contain the current frame. This reconstructed data on line 70 may be applied to a video screen via suitable conversion circuitry. Such a receiver may be conventional.

If a determination is made by the motion estimator 42 that the pels of a block have not significantly changed as compared with the previous frame (which is usually the case), a difference signal and zero motion vector are transmitted which signifies to the receiver/decoder that it needs to merely repeat the pels of that block from the previous frame to obtain the pels for the current block. Such a determination of non-movement of a block may be that the total number of bits identified by look-up table 44 is below a threshold number.

Figure 4:
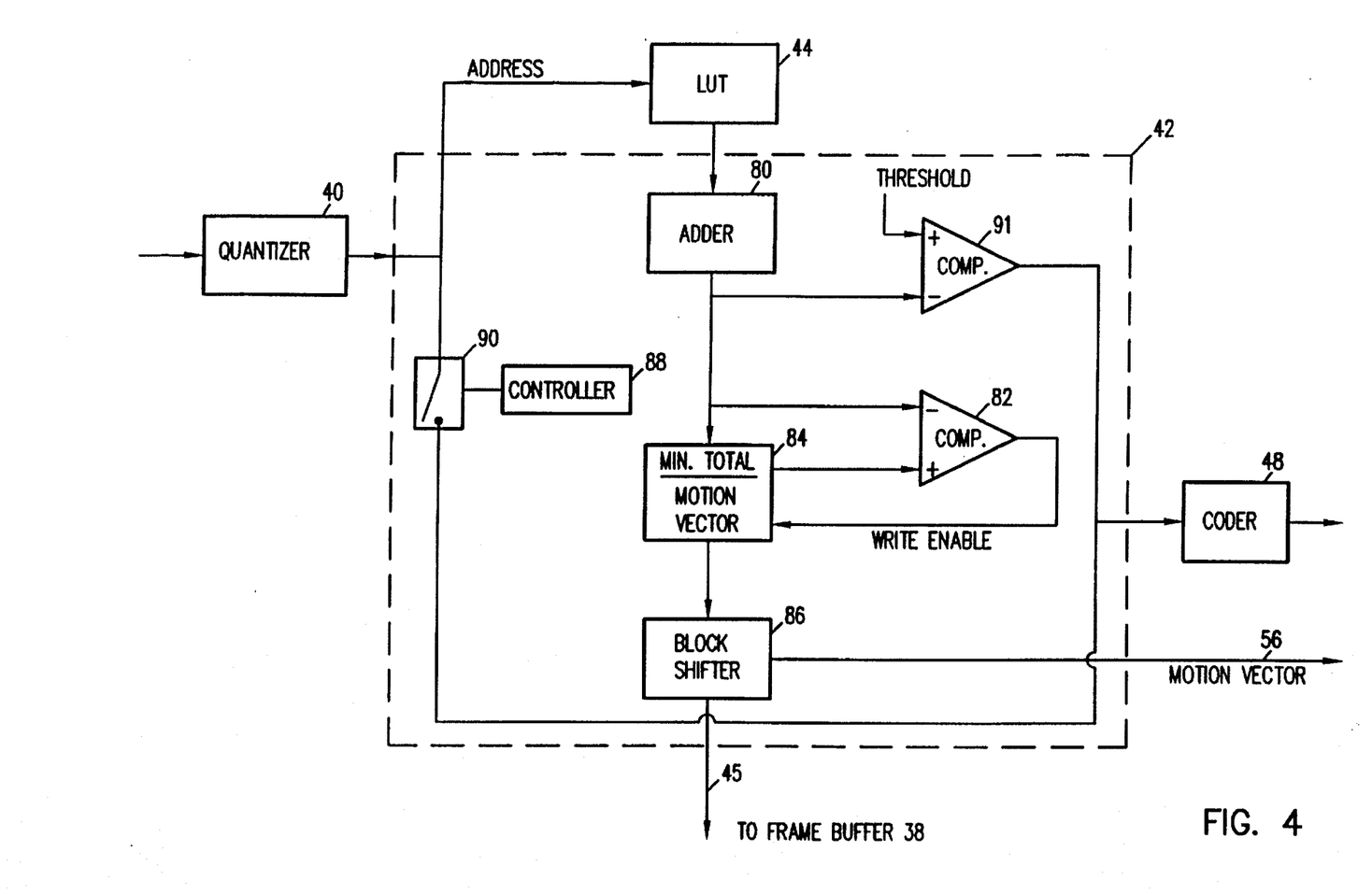
FIG. 4 illustrates the basic functional blocks of one embodiment of the motion estimator.

FIG. 4 is a simplified block diagram illustrating certain functional elements of one embodiment of the motion estimator 42. Numerous other implementations would be apparent to those skilled in the art.

The output of quantizer 40 is applied as an address to look-up table 44. Look-up table 44 outputs the number of bits corresponding to the output of quantizer 40. Adder 80 totals the number of bits representing the block of data. This total is applied to one input of a comparator 82. A memory 84 stores the smallest total count thus far outputted by adder 80 for the present block. This smallest total count is applied to a second input of comparator 82.

When comparator 82 detects a smaller count outputted by adder 80, the count and the corresponding motion vector are then stored in memory 84. The output of comparator 82 may be connected to a write enable port of the memory 84.

A conventional block shifting routine is carried out by block shifter 86, which incrementally shifts the blocks outputted by frame buffer 38 (FIG. 2). When the minimum total count and best estimate shift have been determined, the block shifter 86 causes the frame buffer 38 to output the block corresponding to that shift. A control signal generated by controller 88 closes switch 90, which connects the output of quantizer 40 to coder 48. The motion vector corresponding to the best estimate shift is outputted on line 56.

If the initial output of quantizer 40 indicates that no significant movement of the block has taken place since the last frame, a zero motion vector is transmitted and coder 48 transmits the current difference signal. In one embodiment, coder 48 is controlled to output a very low bandwidth signal to the receiver indicating such non-movement. Detecting no significant block movement may be accomplished in one embodiment by comparing the initial output of adder 80 to a threshold number, using comparator 91. If the threshold number is not exceeded, the comparator 91 controls controller 88 to close switch 90 or controls coder 48 to output a signal indicating that there has been no movement of the block.

Figure 5:
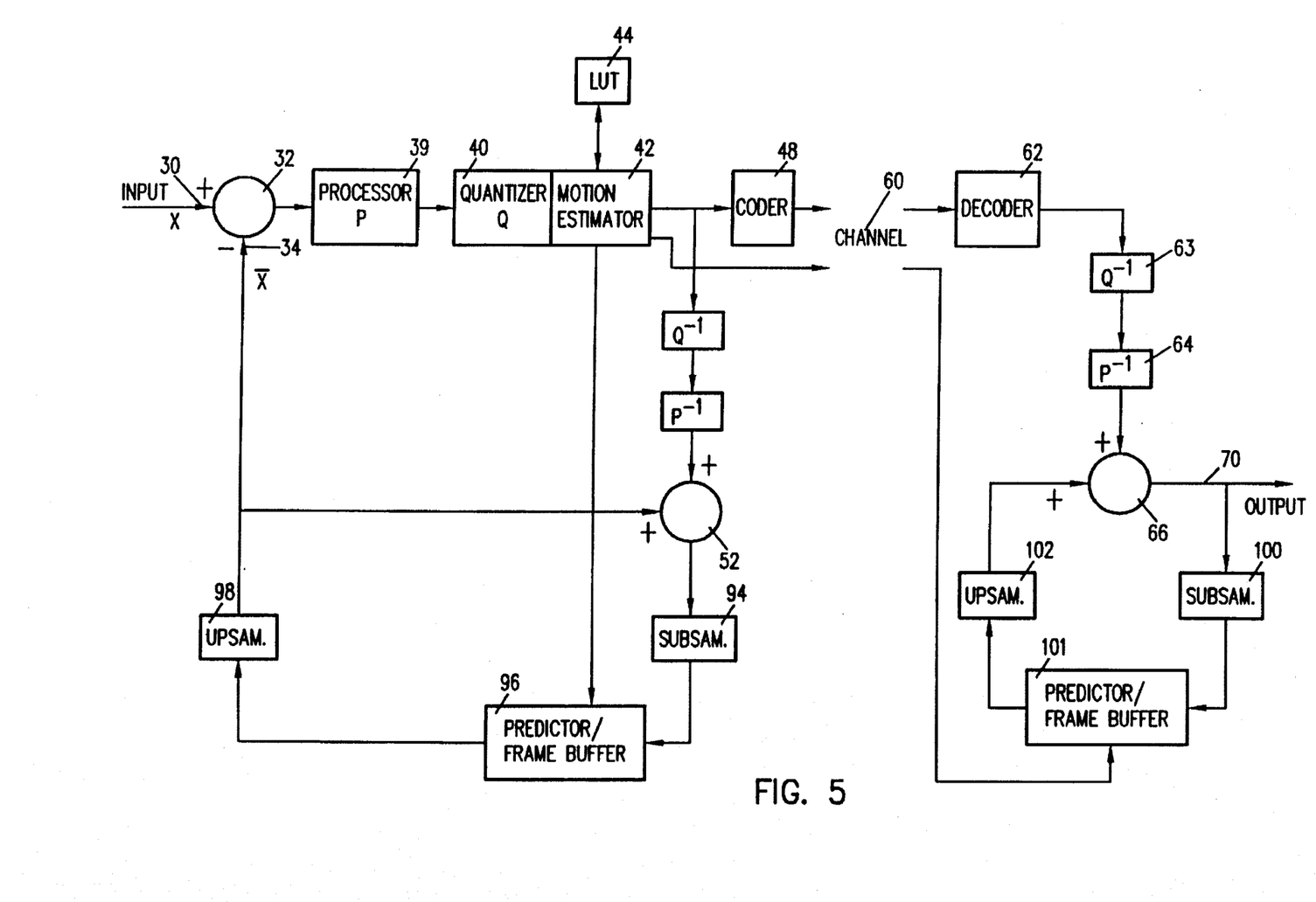
FIG. 5 is a block diagram of an alternative embodiment of the video coding/decoding system which uses a smaller predictor frame memory.

FIG. 5 illustrates another embodiment of a video codec which includes a subsampler 94 connected to the input of a predictor 96. Predictor 96 has the same functions as the frame buffer 38 shown in FIG. 2. Subsampler 94 reduces the rate at which video data outputted by adder 52 is stored in predictor 96. This reduces the storage requirements and bandwidth requirements of predictor 96, thus reducing hardware costs. In one embodiment, subsampler 94 samples every other horizontal pel and every other row of pels to provide 1:4 sampling. Thus, the frame buffer in predictor 96 need be only one-fourth the size of frame buffer 38 in FIG. 2, resulting in considerable cost savings and reducing the size of the video codec.

An upsampler 98 is connected to the output of predictor 96 for generating interpolated data between the successive samples stored in predictor 96. The output of upsampler 98 will be similar to that outputted by frame buffer 38 in FIG. 2. No filtering is performed in the embodiment of FIG. 5.

Additional details of the subsampling and upsampling function is described in our application Ser. No. 08/348,227, entitled "Sub-sampled Frame Storage Technique for Reduced Memory Size," filed herewith and incorporated herein by reference.

The remainder of the circuit of FIG. 5 is identical to that of FIG. 2.

The receiver/decoder portion on the right side of FIG. 5 includes a similar subsampler 100, predictor 101, and upsampler 102. The remainder of the receiver/decoder is identical to that of FIG. 2.

When compressing/decompressing color video signals, the RGB or YUV (or other format) signals may be processed separately using the same codec or may be processed in parallel, which would be readily understood by those skilled in the art.

The various circuits and algorithms for carrying out the embodiments of FIGS. 2, 4, and 5 would be readily understood by those skilled in the art. Since the purpose of this disclosure is to describe an improved motion estimation technique using as much conventional circuitry as possible to reduce complexity and the cost of development, existing block shifting techniques, transformation techniques, quantizer techniques, and variable-length coding techniques may be used in conjunction with the novel best estimate search criterion described herein to obtain the benefits of this invention. Examples of various block shifting techniques and components which may be used in an embodiment of the video codec may be found in the following patents and publications incorporated herein by reference:

| U.S. Pat. No. | Title |
|---|---|
| 5,151,784 | "Multiple Frame Motion Estimation" |
| 5,200,820 | "Block-Matching Motion Estimator for Video Coder" |
| 5,206,723 | "Motion Estimator" |
| 5,227,878 | "Adaptive Coding and Decoding of Frames and Fields of Video" |
| 4,383,272 | "Video Signal Interpolation Using Motion Estimation" |
| 5,144,429 | "High Definition Television Transmission and Reception System With an Improved Motion Estimator and With Reduced Data Throughput" |
| 5,329,318 | "Method for Optimizing Image Motion Estimation" |
| 5,043,808 | "High Definition Television Arrangement Employing Motion Compensated Prediction Error Signals" |
| 4,873,573 | "Video Signal Processing for Bandwidth Reduction" |

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for generating compressed video data comprising the steps of:

receiving video data from a first frame;

generating a difference signal representing differences between said video data from said first frame and video data from a memory storing at least a portion of a previous frame;

motion compensating said video data outputted from said memory if it is determined in said step of generating a difference signal that differences exist between said previous frame and said first frame, said step of motion compensating comprising the steps of:

addressing a look-up table using an address corresponding to said difference signal, which cross-references said difference signal to the number of bits required to be transmitted in order to convey said difference signal; and selecting for motion compensation of said video data from said memory a motion vector which produces a fewest number of bits required to be transmitted to convey said difference signal; and after said step of motion compensating, transmitting said motion vector and said difference signal which resulted in said fewest number of bits required to convey said difference signal.

2. The method of claim 1 further comprising the step of transmitting a signal indicating that no differences have occurred between said previous frame and said first frame if, in said step of generating a difference signal, a determination is made that no differences have occurred.

3. The method of claim 1 wherein said look-up table cross-references said difference signal with the anticipated output of a coder which converts a difference signal into a variable-length bit stream.

4. The method of claim 1 wherein said steps of generating a difference signal, motion compensating said video data, and detecting a number of bits are repeated for different motion compensations of said video data from said memory to identify a particular motion vector in said step of selecting which resulted in said fewest number of bits to convey said difference signal.

5. The method of claim 1 wherein said video data from said first frame is received as blocks of video data and wherein said difference signal represents differences between said blocks of video data from said first frame and blocks of video data from said memory.

6. The method of claim 5 wherein said step of motion compensating said video data outputted from said memory comprises changing address signals applied to said memory to output a motion compensated block of video data from said memory.

7. The method of claim 5 wherein said step of motion compensating said video data outputted from said memory comprises applying address signals to said memory to output shifted blocks within a search window within said memory, and said step of detecting a number of bits required to be transmitted is performed for each shift of said blocks from said memory.

8. The method of claim 7 wherein a fixed number of predetermined shifts of said block is performed prior to said step of selecting.

9. The method of claim 7 wherein shifts of said blocks from said memory are dependent upon results obtained from one or more previous shifts of said blocks, said results being the number of bits required to be transmitted in order to convey said difference signal for said one or more previous shifts.

10. In a motion estimation circuit for a video processor system, a method for determining a best estimate shift of motion compensated video data comprising the steps of:

generating a difference signal representative of a difference between a block of video data from a current frame and a first motion compensated block of video data, shifted by a first motion vector, from a previous frame;

determining a number of bits required to convey said difference between said block of video data from said current frame and said first motion compensated block of video data, shifted by said first motion vector, from said previous frame, said step of determining comprising addressing a look-up table using an address corresponding to said difference signal, which cross-references said difference to the number bits needed to be transmitted in order to convey said difference;

repeating said step of determining for a plurality of motion compensated blocks of video data from said previous frame, each of said blocks being shifted by a different motion vector;

selecting a motion vector associated with a difference requiring a fewest number of bits needed to be transmitted to convey said difference; and transmitting said motion vector and said difference associated with said fewest number of bits.

11. The method of claim 10 wherein an output of said look-up table is applied to an adder which adds the number of bits outputted from said look-up table to determine a sum of said number of bits needed to convey said difference signal for each of said blocks of video data.

12. The method of claim 10 wherein said step of repeating comprises shifting said blocks from said previous frame within a search window in a memory containing video data from said previous frame, wherein a shifting pattern of said blocks within said search window comprises a fixed number of predetermined shifts.

13. The method of claim 10 wherein said step of repeating comprises shifting said blocks from said previous frame within a search window in a memory containing video data from said previous frame, wherein a shifting pattern of said blocks within said search window is dependent upon results obtained from one or more previous shifts of said blocks, said results being the number of bits needed to be transmitted to convey said difference for said one or more previous shifts.

14. A circuit for generating compressed video data comprising:

a subtractor having one input connected to a source of video data from a first frame and having a second input connected to a source of video data from a previous frame; and a motion estimator connected to an output of said subtractor, said motion estimator comprising:

a converter for converting a difference value corresponding to said output of said subtractor to a number of bits required to be transmitted in order to convey said difference value, wherein said converter comprises a look-up table which uses said difference value as an address and which outputs a number of bits corresponding to said difference value;

a detector for receiving said number of bits required to convey said difference value and for determining whether said number is the fewest number of bits detected for conveying said difference value; and a motion vector generator for motion compensating said video data from said previous frame for application to said subtractor and for generating for transmission the motion vector which resulted in said difference value corresponding to said fewest number of bits.

15. The circuit of claim 14 wherein said converter further comprises an adder having an input connected to an output of said look-up table, said adder summing a group of outputs from said look-up table to determine said number of bits required to be transmitted in order to convey said difference value.

16. The circuit of claim 14 further comprising a coder which converts said difference value into a variable-length code for transmission of said difference value.

* * * * *

UNITED STATES PATENT AND TRADEMARK OFFICE
CERTIFICATE OF CORRECTION

PATENT NO.   : 5,627,601
DATED        : May 6, 1997
INVENTOR(S)  : Xiaonong Ran and Michael V. Scherrenburg It is certified that error appears in the above-identified patent and that said Letters Patent is hereby corrected as shown below:

<u>Title page,</u>
Delete "ke16 Claims, 5 Drawing Sheets" and insert -- 16 Claims, 5 Drawing Sheets --.

Signed and Sealed this

Twenty-seventh Day of August, 2002

Attest:

JAMES E. ROGAN
Attesting Officer    Director of the United States Patent and Trademark Office